though in 1 to 4%, however, the enzyme is very unstable and, in order to obtain the enzyme in a dry state stably, it is essential to add at least one member from the group of water-soluble metal salts and water-soluble proteins. The amount of metal salt or protein to be added may be 0.5 to 5% based on the crude solution, preferably 0.5 to 2%.

United States Patent

Tani et al.

[15] 3,674,646
[45] July 4, 1972

[54] METHOD FOR MANUFACTURING PROTEASE

[72] Inventors: Isamu Tani, Tokushima-shi; Masatomi Otsuka, Naruto-shi; Yoshiyasu Osaki, Tokushima-ken; Takuo Hagino, Naruto-shi, all of Japan

[73] Assignee: Otsuka Kagaku Yakuhin Kabushiki Kaisha, Osaka-shi, Japan

[22] Filed: Oct. 22, 1969

[21] Appl. No.: 868,613

[52] U.S. Cl. ............................................................. 195/66
[51] Int. Cl. ....................................................... C12d 13/10
[58] Field of Search ............................................. 195/65, 66

[56] References Cited

FOREIGN PATENTS OR APPLICATIONS 701,119  0/1953  England ................................... 195/66

OTHER PUBLICATIONS

Furukawa et al., Some Properties of Three Proteolytic Enzymes Excreted by Bacillus Cereus, KP931, Agr. Biol. Chem. Volume 32 No. 7, pages 822– 829, 1968.
Chemical Abstracts, Abstracts No. 57140Z; Bacterial Proteases, Vol. 69, pg. 5331, 1968.

Primary Examiner—A. Louis Monacell
Assistant Examiner—Roger B. Andewelt
Attorney—Larson, Taylor and Hinds

[57] ABSTRACT

A method for manufacturing protease which comprises culturing Bacillus sp. 0–20 belonging to the genus Bacillus in a culture medium to produce protease and collecting the protease from the medium.

4 Claims, No Drawings

METHOD FOR MANUFACTURING PROTEASE

This invention relates to a method for manufacturing protease, and more particularly to a method for producing protease by the culture of a specific novel micro-organism belonging to the genus Bacillus.

A main object of the invention is to provide protease having high order of enzymatic activity and a method for preparing the same. The above and other objects of the invention which will be apparent from the description to follow, can be attained by culturing Bacillus sp. 0–20 belonging to the genus Bacillus in a culture medium to produce protease and collecting the protease thus produced from said medium.

The present invention is based on a new discovery that said Bacillus sp. 0–20 is capable of producing protease having an extremely high order of enzymatic activity as compared with other publicly known strains belonging to the genus Bacillus.

The Bacillus sp. 0–20 used in the invention is a novel variant prepared by irradiating with ultraviolet light a certain kind of a rod which is akin to the *Bacillus cereus* disclosed in "Japanese Journal of Bacteriology" Vol. 23, No. 2 (1968), pages 145–151. The present strain, Bacillus sp. 0–20, has been deposited with deposition number FERM–P No. 270 in Fermentation Research Institute of Agency of Industrial Science and Technology, Japan, since Feb. 20, 1969.

The mycological properties of this strain are as follows:
a. Condition of growth in medium
  1. Size: 1.0–1.2 $\mu$ × 5.0–5.2 $\mu$
  2. Form: oval with angular and
  3. Spore: formed, oval, 1.0 $\mu$ × 2.0–2.2 $\mu$
  4. Mobility: Yes, having peritrichous
  5. Degree of growth on each medium
    a. Liquid culture
      Bouillon: slightly turbid with sediment, forming thin film ring. Turbidity is not cleared.
      Peptone water: evenly turbid forming a faint ring.
    b. Stab culture
      Gelatine medium: rapidly liquifies.
    c. Plate culture
      Gelatin medium: hydrolyzed in a wide range.
    d. Slant culture
      Bouillon-agar medium: Grow briskly, lustrous and greyish white in color, spread, wetted and slightly swollen.
      Glucose-bouillon-agar medium: Grow briskly, greyish white in color, wet luster, spread, wetted and slightly denser than the bouillon-agar medium.
      Potato slice: Grow briskly, wet and creamy white in color.
  6. Condition of surface of colony: generally spherical and homogeneous, rough berries, grey white in color.
  7. Color of strain: grey white in color.
  8. Pathogenic property: not recognized.
b. Physiological property
  1. Conditions for growth: pH 6.8–7.2 is the optimum, temperature 30°–32° C is the optimum and no growth at 50° C and is aerobic.
  2. Gram's stain: Positive
  3. Acid fastness: —
  4. Methyl red test: +
  5. Voges Proskauer test: +
  6. Production of indole: +
  7. Production of ammonium: +
  8. Reduction of nitric acid salt: —
  9. Production of catalase: +
  10. Liquefaction of gelatin and casein: +
  11. Production of hydrogen sulfide: +
  12. Hydrolysis of starch: ±
  13. Utility of citric acid: +
  14. Coagulation of cow's milk: +
  15. Reduction of methylene blue: +
c. Utility of carbon source, in which having a property of producing acid is shown +, and not having is shown —
  1. Arabinose: —
  2. Xylose: —
  3. Glucose: +
  4. Mannose: —
  5. Fructose: +
  6. Galactose: +
  7. Maltose: +
  8. Succarose: —
  9. Trehalose: +
  10. Raffinose: —
  11. Sorbit: —
  12. Glycerol: —
  13. Inosite: —
  14. Salycine: +
  15. α-methylglucoside: —
  16. Lactose: —
  17. Inulin: —
  18. Dextrine: —
  19. Starch: —
  20. Cellulose: —

The taxological position of the present strain was determined by comparing the mycological properties thereof with those of other publicly known bacteria in accordance with the method described in Bergey's "Manual of Determinative Bacteriology" (7th edition) with the following result.
  Class: Schizomycetes
  Order: Eubacteriales
  Family: Bacillaceae
  Genus: Bacillus As mentioned above the strain of the invention rapidly liquefies in the gelatine stab culture, and by lightly dying the protoplasm it looks vacuolar, but in voges Proskauer reaction it shows positive and mobile. In these respects it differs from *Bacillus cereus* var. *mycodies*. Further, the present strain produces no acid from arabinose and xylose and it is akin to the *Bacillus cereus* in the growing condition and physiological property. However, the present strain is obviously novel strain which is akin to but different from *Bacillus cereus* in view of the facts that it shows somewhat better growing condition in the glucose-nitric acid salt medium and that it has no properties to reduce nitric acid salt and to produce acid from starch, while *Bacillus cereus* generally produces acids from glycerol and succarose. Moreover, the strain used in the invention is found to be different from the strain KP 931 which is akin to *Bacillus cereus* and which was disclosed in "Journal of the Agricultural Chemical Society of Japan" Vol. 40, No. 6 (1966), pages 252–256, in the production of acids from arabinose, glycerose and succarose, and also to be different from the strain akin to *Bacillus cereus* which was reported in "Japanese Journal of Bacteriology" Vol. 23, No. 2 (1968), pages 145–151, in the production of hydrogen sulfide and of acids from lactose, mannose and succarose. From the above findings the strain used in the invention was ascertained to be novel strain belonging to the genous Bacillus and being a variant akin to *Bacillus cereus*, and was newly named Bacillus sp. 0–20.

The medium used in the invention may be prepared in the conventional manner with glucose, fructose, galactose, maltose and other sugars as a carbon source, and with soybean cake, coan steep liquor and like as a nitrogen source. There may be added an inorganic salt, such as potassium dihydrogenphosphate, potassium chloride, etc. and/or a vitamin, as required. The pH of the medium may be in the range of 5.0 to 9.0, preferably 6.8 to 7.0.

According to the method of the invention the Bacillus sp. 0–20 is inoculated in the medium and the strain is cultured at a temperature of 30° to 38° C for 12 to 72 hours in accordance with shaking or aeration-agitation culture method known in the art, thus producing protease. The resultant protease thus produced and accomodated in the medium may be separated and purified by various known methods, such as precipitation, salting out or dialysis method. When the culture medium used is dilute, concentration with ion-exchange resin or under reduced pressure may also be applied.

For better understanding of the invention examples are given below, in which enzymatic activity [PU] $^{Cas.\ F.R.B.}_{\gamma.\ tyr.}$ of the resultant protease producing a non-protein substance showing folin color corresponding to 1 γ of tyrosine in one minute is shown as one unit of the enzymatic activity, when the protease to be tested is treated in milk casein base at 30° C for 10 minutes and absorbance of trichloroacetic acid-soluble substance is measured at a wave length of 660 mμ.

EXAMPLE 1

In 1,000 ml of water were dissolved 1.4 g of $Na_2HPO_4$, 1.0 g of $KH_2PO_4$, 2.0 g of NaCl, 0.1 g of $M_gSO_4$, 6.0 g of sodium glutamate and 10.0 g of glucose to produce a medium of pH 7.0, and the medium was then sterilized. Bacillus sp. 0–20 was inoculated in the resultant medium and cultured with shaking at 30° C for 3 days. After the strain used was centrifugally separated from the cultured product, the enzymatic activity of the supernatant fluid was measured by casein-folin colorimetry B method mentioned before. The enzymatic activity, $[PU]_{\gamma. \, tyr.}^{Cas. \, FR.B.}$ per ml was 1050.

For comparison the strain which is akin to Bacillus cereus and was disclosed in "Japanese Journal of Bacteriology" Vol. 23, No. 2 (1968), pages 145–151, was cultured in the same manner as in Example 1. The enzymatic activity per ml of the supernatant fluid obtained was measured with the result of $[PU]_{\gamma. \, tyr.}^{Cas. \, FR.B.}$ of 215.

EXAMPLE 2

Bacillus sp. 0–20 was cultured in the same manner as in Example 1 except that the temperature of the medium was maintained at 35° C. The enzymatic activity per ml of the supernatant fluid obtained was measured with the result of $[PU]_{\gamma. \, tyr.}^{Cas. \, FR.B.}$ of 3000.

EXAMPLE 3

In this example was used a medium of pH 7.0 containing 150 g of glucose, 5,000 g of alkali extract containing 500 g of defatted bean cake extract, 50 g of $KH_2PO_4$ and 20 g of $CaCO_3$ dissolved in 10 liters of water. After the medium was sterilized Bacillus sp. 0–20 was inoculated in the medium and cultured by aeration-agitation method at 37° C for 17 hours at a rate of aeration of 1 liter per liter of the medium and at a rotation rate of 300 r.p.m. From the resultant cultured product the strain was centrifugally separated and the protease activity per ml of the supernatant fluid thereof was measured, which showed $PU_{\gamma. \, tyr.}^{Cas. \, FR.B.}$ of 6,000 sulfate at 5°C to salt out the protease. The salted out product was dissolved in 0.02 mole of calcium Said supernatant fluid was saturated with ammonium sulfate at 5° C to salt out the protease. The salted out product was dissolved in 0.02 mole of calcium acetate, and then dialyzed overnight at 3° C with 0.02 mole of calcium acetate. To the dialyzed liquid was further added acetone 0.6 time the volume of the liquid, and after viscous precipitate produced was removed, acetone was further added thereto in an amount 2.5 times the volume of the liquid. The precipitate thus produced was frozen to dryness, whereby a crude enzyme product was obtained. From 1 liter of the supernatant fluid was obtained 800 g of protease in a powder form. The enzymatic activity per mg of the resultant protease was measured with the result of $[PU]_{\gamma. \, tyr.}^{Cas. \, FR.B.}$ of 1050.

What we claim is:

1. A method for manufacturing protease which comprises culturing Bacillus sp. FERM–P No. 270 belonging to the genus Bacillus in a culture medium to produce protease and collecting the protease from the medium.

2. The method for manufacturing protease according to claim 1, in which pH of said culture medicum is in the range of 5.0 to 9.0.

3. The method for manufacturing protease according to claim 2, in which pH of said culture medium is in the range of 6.8 to 7.0.

4. The method for manufacturing protease according to claim 1, in which the temperature of said culture medium is in the range of 30° to 38° C.

* * * * *